Patented Feb. 29, 1944

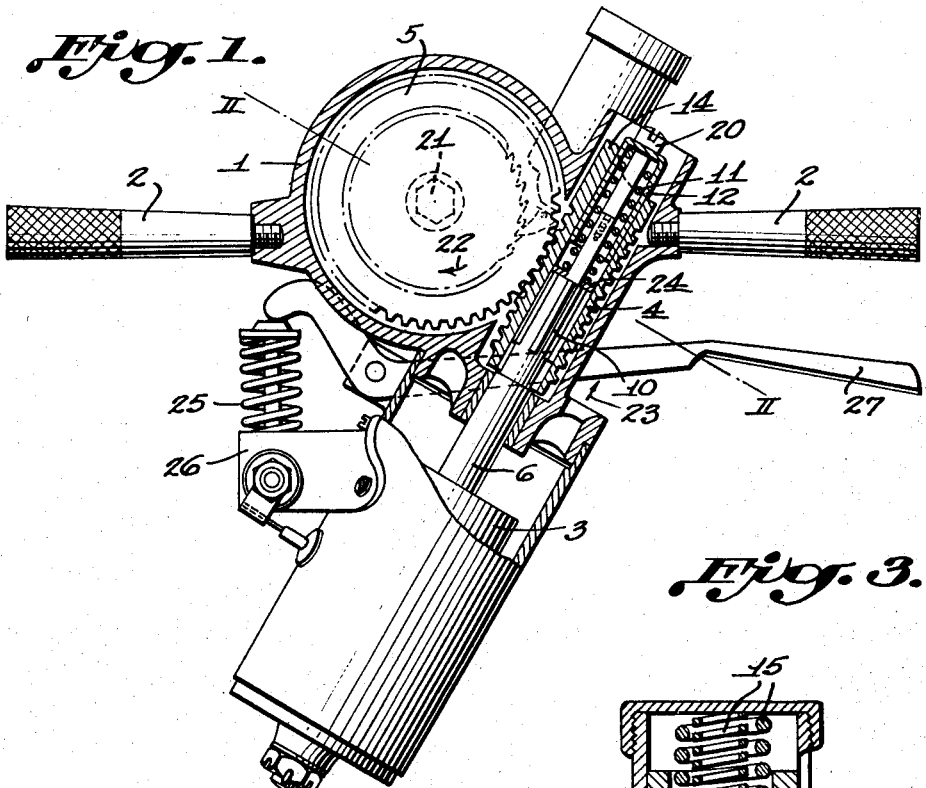
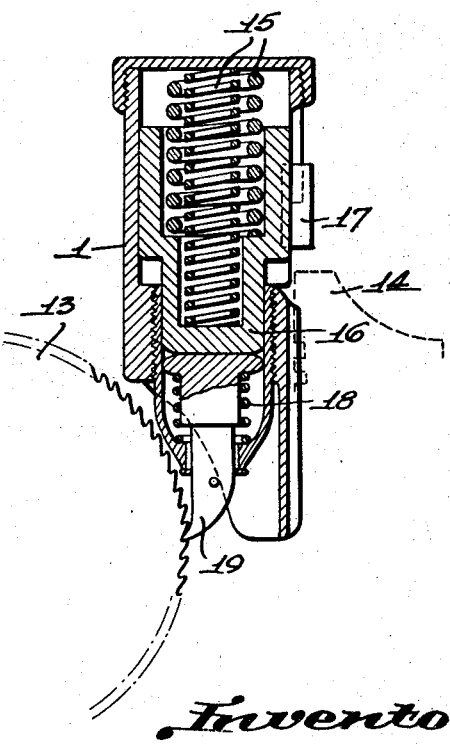
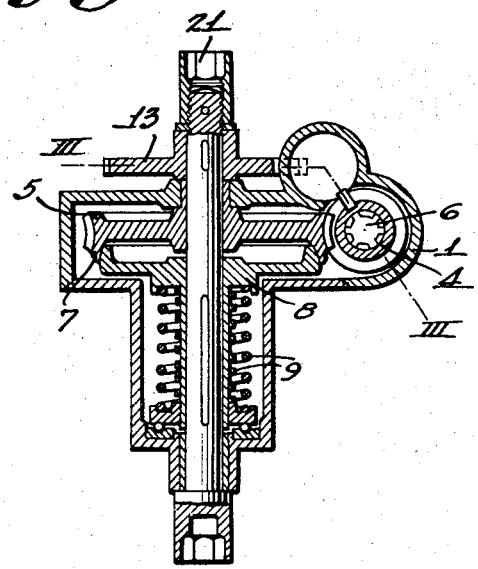
Inventors:
JULIUS ARON
ARTHUR LAMM

2,342,783

UNITED STATES PATENT OFFICE 2,342,783

POWER WRENCH

Julius Aron, Amsterdam, and Arthur Lamm, Gouda, Netherlands; vested in the Alien Property Custodian Application January 25, 1941, Serial No. 375,896
In the Netherlands March 1, 1940

2 Claims. (Cl. 81—57)

The invention relates to power wrenches serving for loosening and tighting screw nuts.

An object of this invention is to facilitate the tightening or loosening of nuts. A friction clutch is arranged concentrically around the axis of a worm wheel which clutch can be displaced lengthwise along the shaft carrying the worm wheel and the sockets which contact the nuts. A worm meshing with the worm wheel is formed with a cam end face which on rotation of the worm intermittently places a spring under tension and such spring then acts on a pawl which by jerkingly turning a ratchet wheel deals blows to the nut in tangential direction.

This ratchet mechanism comes into action only when the resistance against loosening or tightening of the nut or screw is higher than a definite and precisely adjustable torque of the motor. Consequently its action begins and ends automatically.

In the drawing affixed to this specification and forming part thereof an embodiment of our invention is illustrated diagrammatically by way of example.

In the drawing:

Fig. 1 is an axial section, while

Figs. 2 and 3 are cross sections taken substantially on the lines II—II of Fig. 1 and III—III of Fig. 2, respectively, Fig. 3 being drawn to a larger scale.

Referring to the drawing, 1 is the casing and 2 are handles. The casing encloses an electromotor 3 which may be connected to the starter battery of a motorcar. The motor acts on a worm wheel 5 by means of a tubular worm 4 displaceably mounted by a key and slot connection 10 on the motor shaft 6. The worm wheel 5 is formed with a flange 7 constituting one half of a friction clutch, the other part 8 of which is mounted for axial displacement on the worm wheel spindle 5a and is pressed against the clutch part 7 by springs 9.

An annular disk 24 is fixed in the hollow worm 4 and a spring 11 inserted between this disk and the bottom of a sleeve 12, fixed by means of a screw 20 on an extension 6a of the motor shaft, normally holds the worm down on the shaft.

The end face 14 of the worm is inclined relative to the worm axis, forming a cam face which, being axially displaced against the action of the spring 11, lifts a check 17 on the hammer 16 displaceable in the casing 1 against the action of strong springs 15, which are then compressed until the check slips off the cam face 14, when the worm is rotated. The hammer 16 is now released and hits the head 18a of a spring-acted pawl 19 acting on the teeth of a ratchet wheel 13 keyed on the worm wheel spindle 5a which carries a wrench 21 on each end.

A switch 26 operated by a hand lever 27 against the action of a coil spring 25 serves for starting the motor.

The operation of this device is as follows:

If the nut or screw to be loosened is not tightened too strongly the motor will be able to rotate it by means of the worm 4, worm wheel 5, clutch 7, 8 and ratchet wheel 13, the latter rotating in the direction of the arrow 22. If the resistance offered by the nut or screw is great, the clutch starts slipping, whereby the worm wheel 5 is braked, the worm 4 now being acted on by the worm wheel in such a manner that the worm is displaced in the direction of the arrow 23. The cam face 14 now carries along, by means of the check 17, the hammer 16 which, on the worm being turned, is released of a sudden and under the action of spring 15 thrown against the pawl head 18a. The pawl 19 now turns the ratchet wheel 13 by one tooth, whereupon it is lifted free of the ratchet by the spring 18 when the check 17 is engaged again by the worm 4. The blows striking the head 18a and transmitted to the ratchet wheel effect a loosening of the nut which can now be screwed off by the action of the motor.

If a nut or screw shall be tightened instead of being loosened, the tool need merely be turned about its vertical axis and the mechanism 21 at the other end of the spindle 5a applied to the nut or screw head.

We wish it to be understood that we do not desire to be limited to the details of construction here shown and described, for obvious modifications will occur to a person skilled in the art.

We claim.

1. Power wrench comprising in combination, a spindle, a wrench mounted on said spindle, a worm wheel rotatably mounted on and a ratchet wheel fixed to said spindle, a spring-urged clutch member keyed and axially displaceable on said spindle forming, together with said worm wheel, a friction clutch, a casing enclosing said spindle and clutch, a motor and a motor shaft, which extends tangentially to said worm wheel, being housed in said casing, a spring urged worm keyed and axially displaceable on said shaft and engaging said worm wheel, a pawl arranged for coaction with said ratchet wheel and a spring-urged hammer intermittently engageable with said pawl arranged to be displaced by said worm.

2. The mechanism of claim 1, in which the worm is formed with a cam face shaped so as to be able to lift and suddenly release the hammer.

JULIUS ARON.
ARTHUR LAMM.